United States Patent [19]
Richardson

[11] 3,980,236
[45] Sept. 14, 1976

[54] SLINGER SPREADER
[75] Inventor: James L. Richardson, St. Paul, Minn.
[73] Assignee: Veda, Inc., Long Lake, Minn.
[22] Filed: May 19, 1975
[21] Appl. No.: 578,385

Related U.S. Application Data
[63] Continuation of Ser. No. 435,843, Jan. 23, 1974, abandoned.

[52] U.S. Cl................................ 239/172; 239/662; 239/675
[51] Int. Cl.² ......................................... B05B 15/00
[58] Field of Search ........... 239/146, 662, 672, 675, 239/676, 172, 456, 517, 518, 524, 513, 521; 222/176, 178

[56] References Cited
UNITED STATES PATENTS
| | | | |
|---|---|---|---|
| 2,099,369 | 11/1937 | Lutz................................. | 239/675 X |
| 3,420,452 | 1/1969 | Vaughan.......................... | 239/675 X |
| 3,528,612 | 9/1970 | Van Der Lely..................... | 239/172 |

FOREIGN PATENTS OR APPLICATIONS
| | | | |
|---|---|---|---|
| 6,617,749 | 6/1968 | Netherlands........................ | 239/172 |

Primary Examiner—John J. Love
Attorney, Agent, or Firm—Burd, Braddock & Bartz

[57] ABSTRACT

A liquid manure spreader having a tank for carrying liquid manure. An auger assembly driven by a power take-off from a tractor extends longitudinally along the bottom of the tank and delivers liquid manure to an impeller mounted on the back wall of the tank. The center section of the auger assembly is carried by a bearing mounted on the transverse baffle. The impeller discharges the liquid manure under pressure through a valve to a spreader structure. The spreader structure has a generally horizontal spreader plate which directs the liquid manure in a wide, relatively low spread pattern. A gate adjustably mounted on the spreader structure varies the density of the manure in the spread pattern.

33 Claims, 8 Drawing Figures

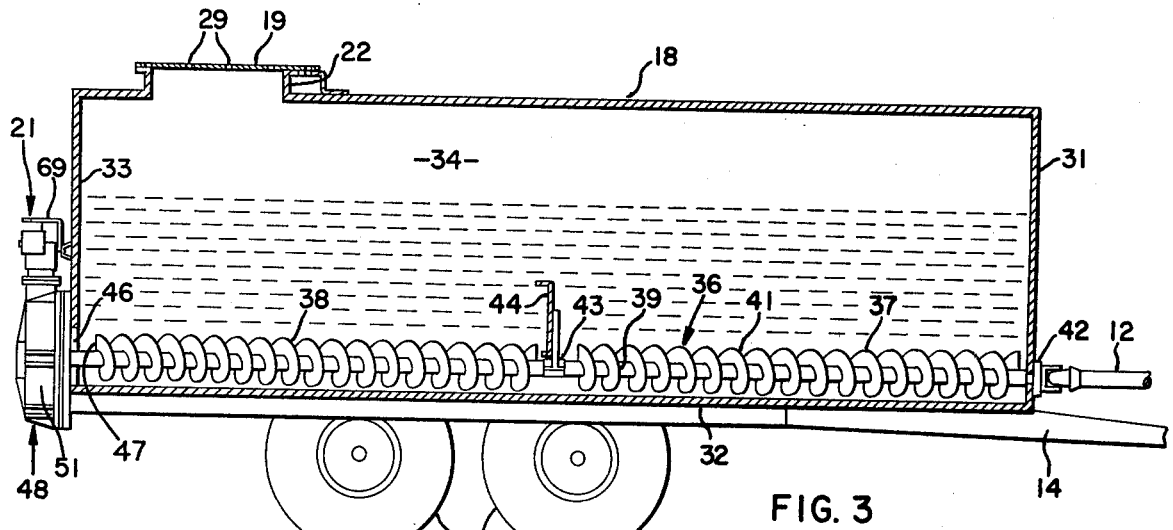
FIG. 3
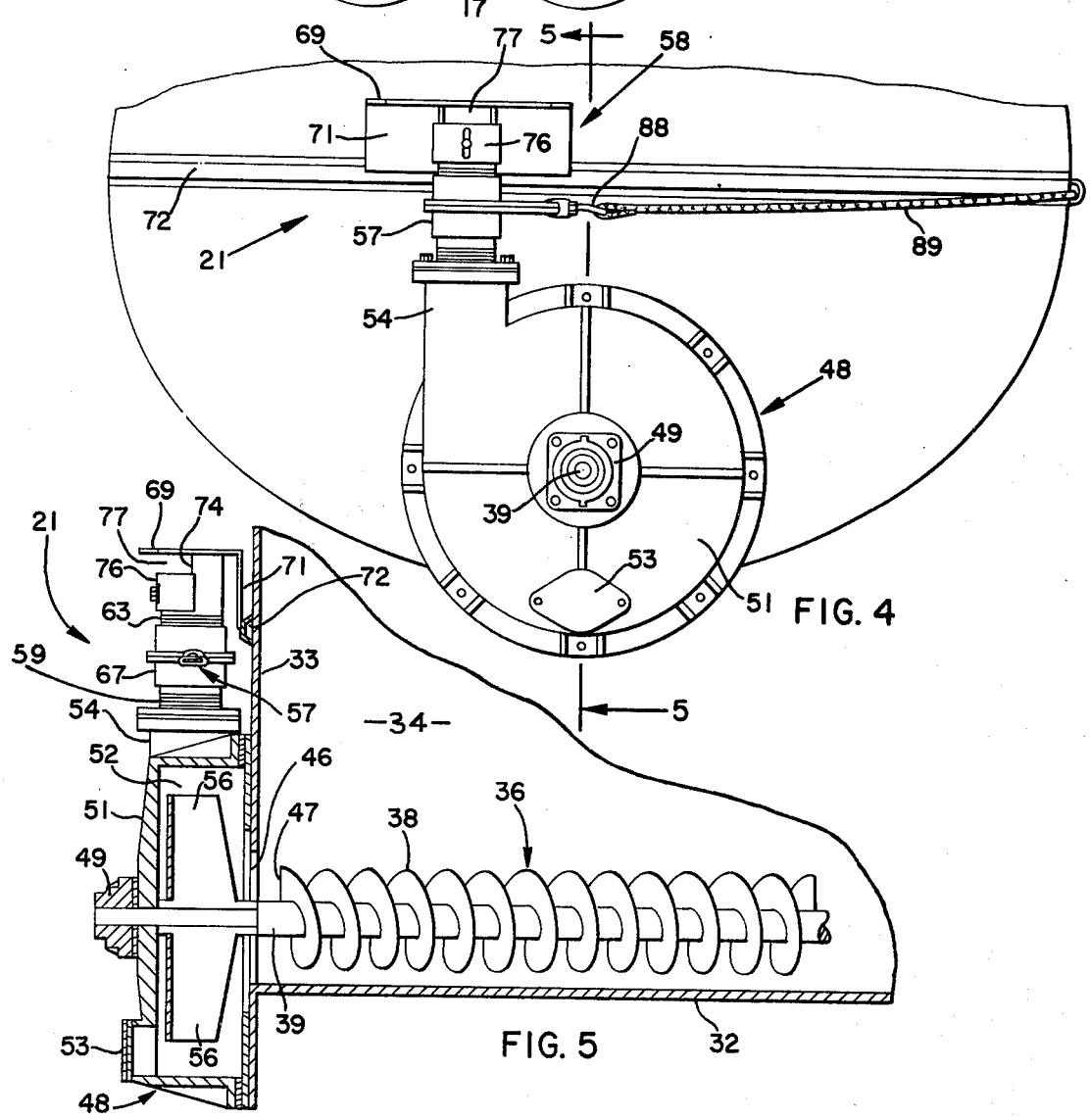
FIG. 4
FIG. 5

SLINGER SPREADER

This application is a continuation of application Ser. No. 435,843, filed Jan. 23, 1974, now abandoned.

BACKGROUND OF THE INVENTION

1. Field of Invention

The invention is directed to bulk material spreaders operable to discharge a relatively wide pattern of material behind the spreader. More particularly, the invention is directed to a liquid manure spreader for discharging liquid and solid manure behind the spreader in a relatively wide swath.

2. Prior Art

Liquid manures have been handled in various ways to insure the maximum utility of the manure and minimize waste and runoff. One system of handling liquid manures is to store the manure in tanks or lagoons until it is spread on agricultural land. The manure is pumped from the storage area into mobile tanks. The mobile tanks have pumping mechanisms operable to spread the manure from the tanks as they are pulled over the agricultural land. The discharge structures of the pumps have nozzle-like devices which discharge the manure in streams into the air. The streams are directed upwardly into the air whereby the air spreads the manure. On a windy day, the wind will carry or blow the liquid manure back to the operator, making the job uncomfortable and undesirable. Furthermore, the spread pattern of these discharge structures have a "rooster comb" design, are relatively uneven, and difficult to control.

SUMMARY OF INVENTION

The invention relates to an apparatus for spreading liquid and particulate materials, as manure, onto a selected area or location. More particularly, the apparatus has means operable to discharge material in a relatively even and controlled swath in a manner that eliminates the rooster comb pattern and blow-back features of prior art spreader devices.

The apparatus has a tank for carrying liquid manure. A slinger assembly mounted on the tank pumps the manure from the tank and discharges the manure in a relatively low, generally horizontal and even spread pattern. The slinger assembly has spreader structure which includes a generally horizontal spreader plate located over a manure discharge opening. The size of the discharge opening is adjustable with a movable gate used to regulate the density of the manure in the spread pattern. An auger located along the bottom of the tank operates to continuously mix the manure in the tank and provide a constant feed of manure to the slinger assembly.

An object of the invention is provide a liquid manure spreader with a manure slinger that dispenses manure in a low profile and even and controlled center spread swath, and eliminates rooster combing and undesirable blow-back on the operator. A further object of the invention is to provide a liquid material tank with a center cross member that acts as a baffle to minimize surging in the tank. A further object of the invention is to provide a liquid material spreading apparatus with a longitudinal auger assembly operable to continuously mix and constantly feed liquid material into a discharge impeller. Another object of the invention is to provide a discharge impeller with valving means adjacent a horizontal spreader unit to control the discharge of liquid material therefrom. A further object of the invention is to provide a liquid material spreading apparatus with a spreader structure having an adjustable discharge opening operable to vary the density or amount of material spread over a swath. Yet another object of the invention is to provide a liquid manure spreader that is relatively simple in design, dependable in use and operates with a minimum of maintenance.

BRIEF DESCRIPTION OF DRAWINGS

FIG. 3 is a longitudinal sectional view of the apparatus;

FIG. 4 is an enlarged rear elevational view of the lower section of the tank;

FIG. 5 is an enlarged sectional view taken along the line 5—5 of FIG. 4;

DESCRIPTION OF PREFERRED EMBODIMENT

Figure 1:
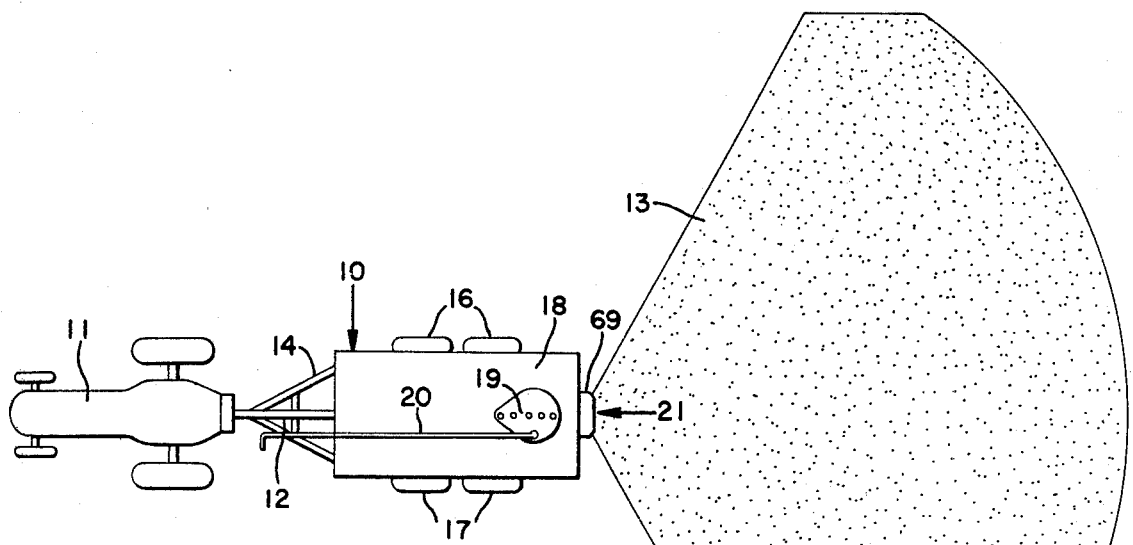
FIG. 1 is a diagrammatic plan view of the material spreading apparatus of the invention showing the center spread swath behind the apparatus.

Referring to FIG. 1, there is shown the spreader apparatus of the invention indicated generally at 10 towed by a tractor 11. The conventional power take off drive 12 couples the PTO of the tractor to the spreader apparatus 10. The spreader apparatus 10 has a longitudinal frame with an A-frame hitch 14. Side tandem wheels 16 and 17 connected to the frame support the spreader apparatus 10 on the ground. An elongated material holding tank 18 is mounted on the frame. The rear portion of the top of the tank has a generally flat plate-like cover 19 closing a fill hole providing access into the tank. A forwardly extended control rod 20 is connected to one side of the cover 19 so that the cover 19 can be conveniently opened and closed from the front of the spreader apparatus 10. A slinger indicated generally at 21 is mounted on the back of the tank and functions to control the discharge of material in a controlled central pattern swath that has a relatively low profile. The material is discharged in a generally horizontal and rearwardly diverging direction. The material hereinafter used in this description is liquid manure. Other liquid, semisolid, and particulate materials can be spread with apparatus 10.

Figure 2:
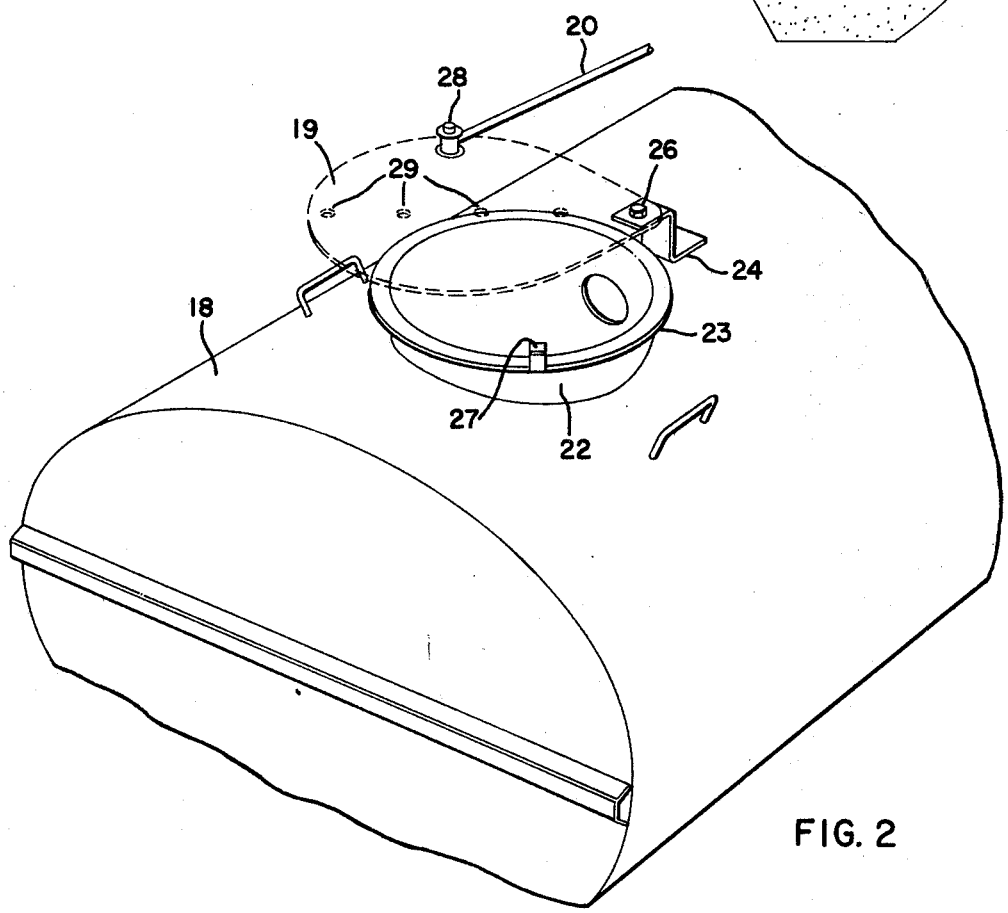
FIG. 2 is a perspective view of the top of the rear of the tank of the apparatus with the fill hole cover partly closed.

Referring to FIG. 2, tank 18 has a generally upright short cylindrical member or tube 22 extended upwardly from the rear portion of the top wall thereof. The top edge of tube 22 has an outwardly directed flange 23. Located adjacent the forward portion of flange 23 is a Z-shaped bracket 24. The lower leg of bracket 24 is secured to the top of tank 18 with a weld or like attaching structure. A pivot member 26, as a pin or bolt, pivotally connects a portion of cover 19 to the bracket 24 whereby the cover 19 can pivot to opened and closed positions relative to the opening surrounded by tube 22. When the cover 19 is in the closed position, it fits under a portion of a clip 27 secured to flange 23. The control rod 20 for cover 19 is pivotally connected to the cover with upright pin or projection 28. The cover 19 has a plurality of holes 29 which permit the flow of air into the tank to replace the manure that is spread or discharged from the tank.

Referring to FIG. 3, tank 18 has an upright front wall 31 and a generally horizontal bottom wall 32. An upright rear wall 33 is secured to the bottom wall 32 and defines therewith a chamber 34 for storing the liquid manure. Liquid manure is a mixture of solid and liquid animal wastes which may contain particulate materials, as straw, hay and the like. The resultant material has a semi-solid consistency which can vary according to the amount of liquid in the solids.

Located longitudinally along the bottom wall 32 is an auger assembly indicated generally at 36. Auger 36 has a forward section 37 and a rear section 38. The sections 37 and 38 each have a longitudinal shaft 39 and continuous helical flights 41. Shaft 29 is mounted on front wall 31 with a bearing 42. The portion of the shaft 39 projected forwardly from the wall 31 is connected to the power takeoff drive 12 with a conventional universal joint. The midsection of shaft 39 is rotatably supported in a bearing 43. Bearing 43 is attached to a fixed cross member 44. Cross member 44 extends across the mid section of the chamber 34 and functions as a baffle to minimize surging of the material in the tank.

The rear wall 33 has a hole or inlet opening 46 in axial alignment with the rear of the auger section 38. The flight 41 of auger section 38 terminates at 47 a short distance inward of hole 46. The shaft 39 extends through hole 46 and into an impeller indicated generally at 48 mounted on the lower portion of the outside wall 33. As shown in FIGS. 4 and 5, shaft 39 is rotatably mounted on a bearing 49 carried by the impeller housing 51. The housing 51 defines a chamber 52 open via the opening 46 to the tank chamber 34. The lower part of housing 51 has a drain door 53 which can be removed to drain material from the chamber 52. A plurality of radially outwardly directed paddles or blades 56 are secured to a portion of the shaft located in chamber 52. The paddles 56 rotate with shaft 39 and thereby rotate impeller paddles 56 which pump the manure through an opening in the outlet 54 of the impeller housing 51. As shown in FIG. 4, outlet 54 extends in an upward direction and has an opening that is generally tangential to the circular shape of the chamber 52.

Figure 7:
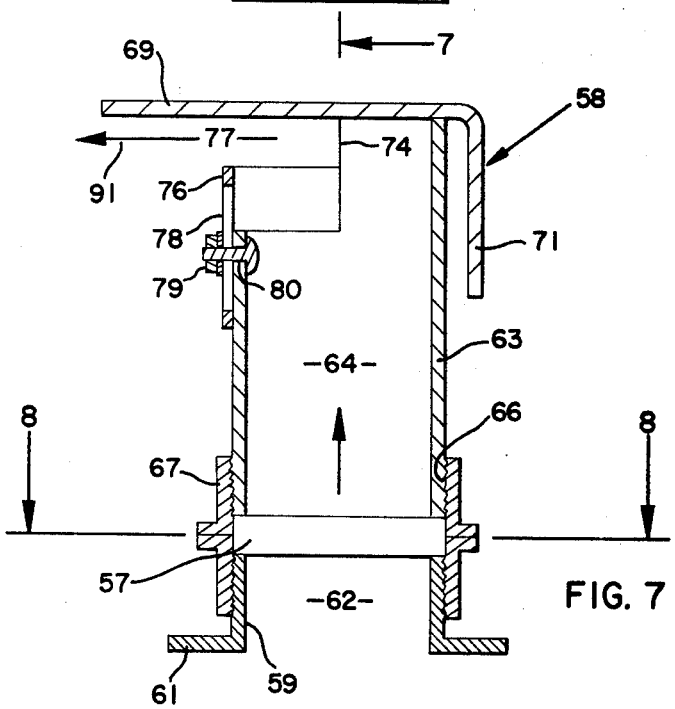
FIG. 7 is a sectional view taken along the line 7—7 of FIG. 6.

A short upwardly directed nipple or cylindrical member 59 is mounted on top of the outlet 54. As shown in FIG. 7, nipple 59 has an outwardly directed flange 61 secured to the top flange of the outlet 54 and a passage 62 in alignment with the outlet passage. Mounted on the nipple 59 is a control valve indicated generally at 57. Spreader structure indicated at 58 is located above control valve 57. A coupling 67 connects the control valve 57 and the spreader structure 58 to the nipple 59.

The spreader structure 58 comprises an upright pipe or tubular cylinder 63 having a passage 64 in alignment with passage 62. Cylinder 63 has a lower threaded end 66 turned into coupling 67. Located over the top of cylinder 63 is a generally horizontal rearwardly projected spreader plate 69. Spreader plate 69 is secured by welds or the like to the top edge of the cylinder 63. Spreader plate 69 has a downwardly directed flange 71 secured by welds or the like to a generally transverse horizontal rib 72 mounted on the back wall 33 of the tank 18, as shown in FIGS. 4 and 5. The outer corners 73 of spreader plate 69 are beveled. Plate 69 projects laterally from opposite sides of cylinder 63. This lateral distance is greater than the diameter of cylinder 63. As shown in FIG. 7, plate 69 projects rearwardly from the rear edge of cylinder 63 a distance of about one-half the diameter of cylinder 63.

Figure 6:
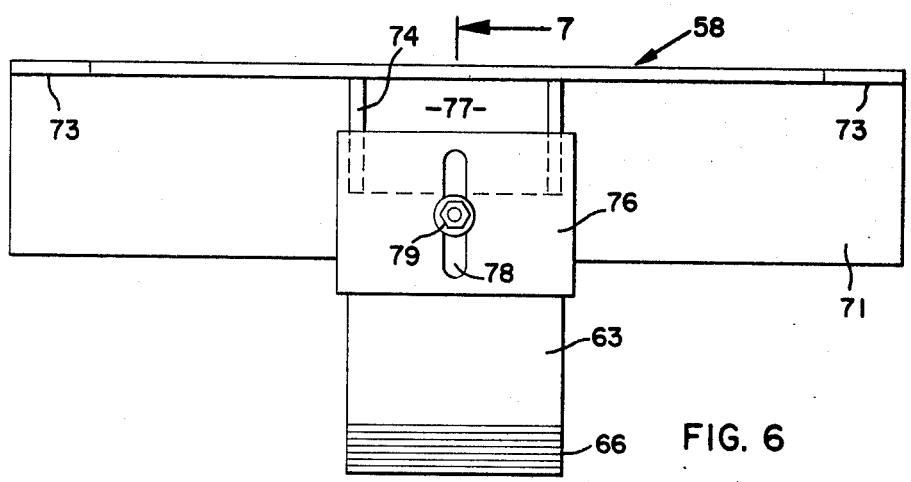
FIG. 6 is an enlarged rear elevational view of the discharge and spreader unit of the spreading structure.

As shown in FIGS. 6 and 7, the rear portion of the upper end of the cylinder 63 has semi-cylindrical cutout section 74 to provide the cylinder with a rearwardly directed discharge opening 77. The cutout or opening 74 has a semi-circular shape as the upright sides of the top portion of cylinder 63 are in a plane that passes through the diameter of the cylinder 63. Opening 77 is immediately below the horizontal plate 69. The size of opening 77 is adjusted with a gate means 76. The gate means 76 is a generally semi-cylindrical member having a radius of curvature substantially equal to the curvature of the outside of the cylinder 63. The midportion of gate means 76 has an upwardly directed slot 78. A nut and bolt assembly 79 projects through a hole 80 in the cylinder 63 and through slot 78 to fix the position of the gate relative to cylinder 63. The nut and bolt assembly 79 can released whereby the gate means 76 can be vertically adjusted to alter the size of discharge opening 77.

Figure 8:
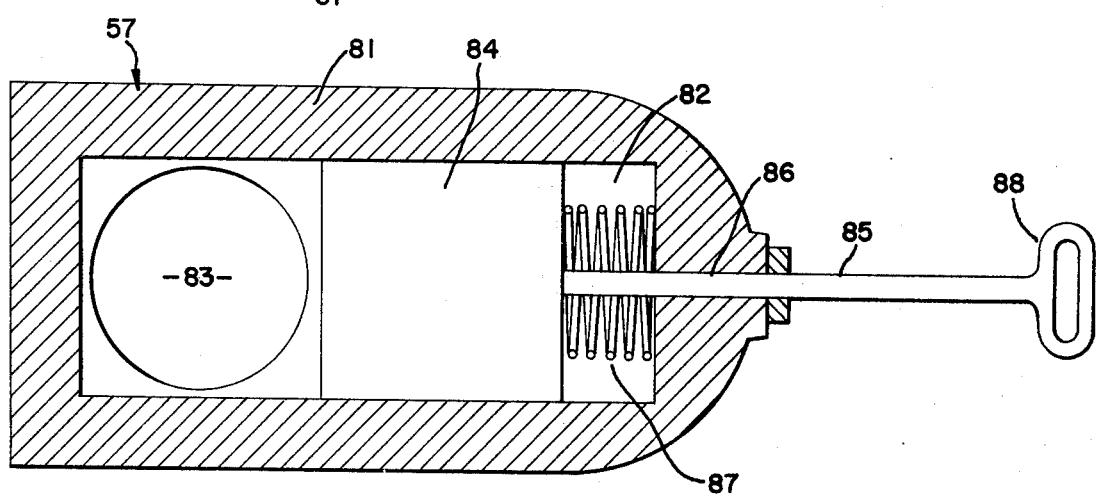
FIG. 8 is an enlarged sectional view taken along the line 8—8 of FIG. 7.

Referring to FIG. 8, the valve 57 has a generally elongated housing 81 having a chamber 82. One end of the chamber has an opening 83 in alignment with the passages 62 and 64 to permit the movement of manure upwardly into the spreader structure 58. Slidably located in chamber 82 is a slide or valving member 84 operable to selectively open and close the opening 83. An elongated control rod 85 slidably positioned in a longitudinal bore 86 is connected to slide 84. A compression spring 87 located in chamber 82 around the rod 85 and in engagement with slide 84 functions to bias the slide 84 to the closed position. The outer end of control rod 85 has a ring or eye 88. An elongated cord or line 89, as shown in FIG. 4, is attached to eye 88. The cord 89 extends around the tank 18 to a position where it is conveniently pulled by the operator of the tractor. Other types of valves can be used to control the flow of manure to the spreader structure 58.

In use, the tank 18 is filled with liquid manure through the inlet opening defined by the upright tube 22. The cover 19 is closed as soon as the tank is full. The tank is towed to the discharge location, such as an agricultural field. The tractor PTO is engaged and thereby drives the auger assembly 36. The cross member 44 acts as a transverse baffle minimizing the surge of the liquid manure in the tank 18. The rotating auger assembly 36 agitates the manure and provides for continuous mixing and constant feeding of the manure through opening 46 into the impeller chamber 52. The rotation of the auger assembly 36 also rotates the paddles or blades 56 thereby pumping the liquid manure in the chamber 56 and subjecting the liquid manure to pressure. The liquid manure under pressure is moved upwardly through passages 62 and 64 and into engagement with the bottom surface of the spreader plate 69. The valve 57, being in the open position, permits the flow of liquid manure through the valve. The liquid manure is discharged in the direction of arrow 91 in a relatively low spread pattern, shown at 13 in FIG. 1. The low spread pattern has a relatively uniform horizontal distribution which eliminates rooster combing and undesirable blow-back on the operator. The spread pattern has a relatively even distribution over a wide swath. A spreading width of approximately 40 feet is achieved with the PTO operating at approximately 500–550 rpm. The density or amount of material spread is controlled by the size of discharge opening 77. The gate 76 is vertically adjustable to change the height of opening 77 and thereby adjust the density of the distribution pattern.

While there has been shown and described a preferred embodiment of the invention, it is understood that various changes in structure and design may be made by those skilled in the art without departing from the spirit of the invention.

The embodiments of the invention in which an exclusive property or privilege is claimed are defined as follows:

1. An apparatus for spreading material, as liquid manure, in a low generally horizontal spread pattern onto a location comprising: tank means having an end wall and a tank chamber for carrying the material, slinger means mounted on the end wall for moving material from the tank means and discharging the material to a location, said slinger means having spreading structure and a pump assembly to deliver material under pressure to the spreading structure, said pump assembly including a housing mounted on the end wall, said housing having a chamber and an inlet opening open to the tank chamber and an upright section having an upwardly open outlet opening, and impeller means in the housing chamber to move material from the inlet opening to the outlet opening, an auger assembly located longitudinally along the bottom of the tank chamber, said auger assembly having an end located adjacent said inlet opening, means connecting the auger assembly and impeller means, transverse baffle means located in the midsection of the tank chamber above the auger assembly, means attached to the baffle means rotatably supporting the midsection of the auger assembly, means connected to the auger assembly and adapted to be connected to a drive unit, said drive unit operable to rotate the auger assembly and impeller means whereby the auger assembly mixes the material in the tank chamber and feeds material to the pump assembly, said spreading structure including upright means having a passage and a discharge opening mounted on the upright section to receive material from the outlet opening, valve means between the pump assembly and spreading structure for controlling the flow of material to the spreading structure, generally horizontal plate means secured to the upright means and extended over and located above the discharge opening for directing material moving from the discharge opening in a relatively low horizontal profile and even spread pattern rearwardly and to opposite sides of the tank means, and means for adjusting the size of the discharge opening to regulate the density of the spread pattern.

2. The apparatus of claim 1 wherein: the means connecting the auger assembly and impeller means comprises a common drive shaft means connected to the impeller means and auger assembly.

3. The apparatus of claim 1 wherein: said plate means projects laterally from opposite sides of the discharge opening.

4. The apparatus of claim 1 wherein: said plate means projects forwardly in the material discharge direction of said discharge opening.

5. The apparatus of claim 1 wherein: the means for adjusting the size of the discharge opening comprises a member mounted on the upright means, said member having an edge forming the lower side of the discharge opening, said edge extended generally parallel to said horizontal plate means.

6. The apparatus of claim 1 wherein: said upright means having a discharge opening is a generally upright tubular cylinder, said cylinder having a cutout section forming the discharge opening, said plate means located on top of said cylinder.

7. The apparatus of claim 6 wherein: said cutout section has a semi-cylindrical shape.

8. The apparatus of claim 6 wherein: said plate means projects laterally from opposite sides of said discharge opening and forwardly in the material discharge direction of said discharge opening.

9. The apparatus of claim 6 wherein: the means for adjusting the size of the discharge opening includes a semi-cylindrical member, and means to adjustably mount the member on the cylinder.

10. The apparatus of claim 9 wherein: said member has an edge forming the lower side of the discharge opening, said edge extended generally parallel to said horizontal plate means.

11. An apparatus for spreading material, as liquid manure, in a low generally horizontal spread pattern onto a location comprising: tank means having a tank chamber for carrying material slinger means for moving material from the tank chamber and discharging the material to a location, said slinger means having spreading structure and a pump assembly including a housing mounted on the tank means, said housing having a chamber and an inlet opening open to the tank chamber and an outlet opening, and impeller means in the housing chamber to move material from the inlet opening to the outlet opening, an auger assembly located longitudinally along the bottom of the tank chamber, said auger assembly having an end located adjacent said inlet opening, means connecting the auger assembly and impeller means, transverse baffle means located in the midsection of the tank chamber above the auger assembly, means attached to the baffle means rotatably supporting the midsection of the auger assembly, means connected to the auger assembly and adapted to be connected to a drive unit, said drive unit operable to rotate the auger assembly and impeller means whereby the auger assembly mixes the material in the tank chamber and feeds material to the pump assembly, said impeller means operable to deliver material under pressure to the spreading structure, said spreading structure including a generally upright tubular cylinder mounted on the housing, said cylinder having a cutout section with side edges and a bottom edge forming a discharge opening, and generally horizontal plate means secured to the cylinder and extended over and located above the discharge opening and forming a top wall extended generally parallel to the bottom edge for directing material moving from the discharge opening in a relatively low horizontal profile and even spread pattern rearwardly and to opposite sides of the tank means.

12. The apparatus of claim 11 wherein: said plate means projects laterally from opposite sides of the discharge opening.

13. The apparatus of claim 11 wherein: said plate means projects forwardly in the material discharge direction of said discharge opening.

14. The apparatus of claim 11 including: valve means selectively operable to allow the material to flow to the discharge opening and block the flow of material to the discharge opening.

15. The apparatus of claim 11 wherein: said cutout section has a semi-cylindrical shape.

16. The apparatus of claim 11 including: means for adjusting the size of the discharge opening and means to adjustably mount said means for adjusting the size of the discharge opening on the cylinder.

17. The apparatus of claim 16 wherein: the means for adjusting the size of the discharge opening includes a semi-cylindrical member slidably mounted on said cylinder.

18. The apparatus of claim 11 wherein: the means connecting the auger assembly and impeller means comprises a common drive shaft means connected to the impeller means and auger assembly.

19. An apparatus for spreading material, as liquid manure, in a low generally horizontal spread pattern onto a location comprising: tank means having a tank chamber for carrying the material, spreading structure for receiving material under pressure and discharging the material in a relatively low and generally horizontal profile and even spread pattern, a pump assembly including a housing mounted on the tank means, said housing having a chamber and an inlet opening open to the tank chamber and an outlet opening, and impeller means in the housing chamber to move material from the inlet opening to the outlet opening into the spreading structure, an auger assembly located longitudinally along the bottom of the tank chamber, said auger assembly having an end located adjacent said inlet opening, means connecting the auger assembly to the impeller means, means in the tank chamber rotatably supporting a midsection of the auger assembly, means connected to the auger assembly and adapted to be connected to a drive unit, said drive unit operable to rotate the auger assembly and impeller means whereby the auger assembly mixes material in the tank chamber and feeds material to the pump assembly, said impeller means being operable to deliver material under pressure to the spreading structure, said spreading structure including a generally upright tubular cylinder having an inlet for receiving the material under pressure, valve means for controlling the flow of material from the pump assembly to said cylinder, said cylinder having a cutout section with side edges and a bottom edge forming a discharge opening, generally horizontal plate means secured to the outlet end of the cylinder closing the outlet end and located above the discharge opening and forming a top wall extended generally parallel to the bottom edge for directing material moving from the discharge opening in a relatively low and generally horizontal profile and even spread pattern rearwardly and to opposite sides of the tank means, a member larger than the discharge opening having an edge extended generally parallel to the top wall, and fastening means to mount the member on the cylinder in a fixed position on the cylinder, said member being secured to the cylinder in a selected position whereby the size of the discharge opening can be changed by positioning the member relative to the top wall.

20. The apparatus of claim 19 wherein: said cutout section has a semi-cylindrical shape.

21. The apparatus of claim 19 wherein: said plate means projects laterally from opposite sides of said discharge opening and forwardly in the material discharge direction of said discharge opening.

22. The apparatus of claim 19 wherein: said member includes an upright slot and said fastening means extends through said slot to attach the member to the cylinder.

23. The apparatus of claim 22 wherein: the member has a semi-cylindrical shape.

24. Spreading structure for receiving material under pressure and discharging the material in a relatively low and generally horizontal profile and even spread pattern comprising: a tubular cylinder having an inlet for receiving the material under pressure and an open outlet end, said outlet end having a side wall, said side wall having a semicircular cutout section with side edges, a bottom edge, and the top portion of the cutout section being open to the open outlet end, generally horizontal plate means extended over the cutout section and the outlet end closing the outlet end and secured to the side wall, said side edges bottom edge and plate means forming a discharge opening, a semicircular member having an inside surface engageable with the outside surface of the cylinder and an upper horizontal edge extended generally parallel to the plate means, said plate means having a rearwardly directed extension, said extension having a width greater than the thickness of said upper horizontal edge of the semicircular member, and fastening means securing the semicircular member to the cylinder in a fixed nonmovable position to hold the inside surface of the member in engagement with the outside surface of the cylinder and the upper horizontal edge in a fixed spaced relation relative to the plate means thereby forming a discharge opening of a selected size, said member being secured to the cylinder with the fastening means in a selected fixed position, said fastening means being releasable to allow movement of the semicircular member relative to the cylinder whereby the size of the discharge opening can be changed by locating the semicircular member in a selected position relative to the plate means.

25. The apparatus of claim 24 wherein: said plate means projects laterally from opposite sides of the cylinder.

26. The apparatus of claim 24 wherein: said plate means projects forwardly in the material discharge direction of said discharge opening.

27. The apparatus of claim 24 wherein: said plate means projects laterally from opposite sides of the discharge opening and forwardly in the material discharge direction of said discharge opening.

28. The apparatus of claim 24 wherein: said member includes an upright slot and said fastening means extends through said slot to secure the member to the cylinder.

29. An apparatus for spreading material in a relatively low and generally horizontal profile and even spread pattern onto a location comprising: tank means for carrying material, means mounted on the tank means having a material outlet passage, means for moving material from the tank means through the material outlet passage, and material spreading structure means connected to the means having a material outlet passage for receiving material from the passage and discharging the material in a relatively low and generally horizontal profile and even spread pattern rearwardly and to opposite sides of the tank means onto the location, said material spreading structure means having an upright tubular cylinder mounted on the means having a material outlet passage, said cylinder having an open end and a side wall provided with a cutout section formed by vertical edges and a horizontal bottom edge forming a discharge opening, a generally horizontal plate means secured to the cylinder and closing the outer open end of the cylinder above the discharge opening, said plate means providing a top wall extended generally parallel and over the bottom edge for directing material moving from the discharge opening in a relatively low and generally horizontal profile and even spread pattern, a semicircular member having an inside surface engageable with the outside surface of the cylinder and an upper horizontal edge extended generally parallel to the plate means, said plate means having a rearwardly directed extension, said extension extended over the discharge opening and having a width greater than the thickness of said upper horizontal edge of the semicircular member, and fastening means securing the member to the cylinder in a fixed non-movable position to hold the inside surface of the member in engagement with the outside surface of the cylinder and the horizontal edge in a fixed spaced relation relative to the plate means thereby forming a discharge opening of a selected size, said member being secured to the cylinder with the fastening means in a selected position, said fastening means being releasable to allow movement of the semicircular member relative to the cylinder whereby the size of the discharge opening can be changed by locating the semicircular member in a selected position relative to the plate means.

30. The apparatus of claim 29 wherein: said member has an upright slot and said fastening means extends through said slot to attach the member to the cylinder.

31. The apparatus of claim 29 wherein: the means for moving material from the tank means through the material outlet passage includes a pump operable to place the material under pressure.

32. The apparatus of claim 29 wherein: said plate means projects laterally from opposite sides of the discharge opening and forwardly in the material discharge direction of said discharge opening.

33. The apparatus of claim 29 including: valve means selectively operable to allow material to flow to the discharge opening and block the flow of material to the discharge opening.

* * * * *

UNITED STATES PATENT AND TRADEMARK OFFICE
CERTIFICATE OF CORRECTION

PATENT NO. : 3,980,236
DATED : September 14, 1976
INVENTOR(S) : James L. Richardson It is certified that error appears in the above-identified patent and that said Letters Patent are hereby corrected as shown below:

Column 3, line 18, "Shaft 29" should be --Shaft 39--.

Signed and Sealed this

Twenty-first Day of December 1976

[SEAL]

Attest:

RUTH C. MASON
*Attesting Officer*

C. MARSHALL DANN
*Commissioner of Patents and Trademarks*